G. E. JOHNSON.
GREASE CUP.
APPLICATION FILED APR. 29, 1916.
1,195,026.
Patented Aug. 15, 1916.
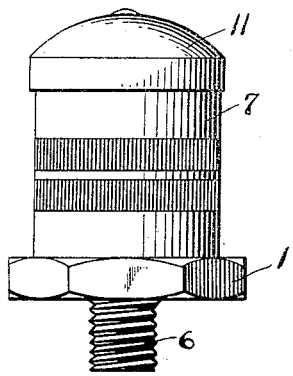
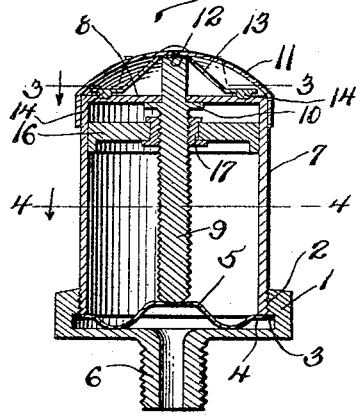
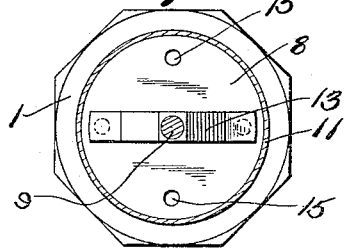 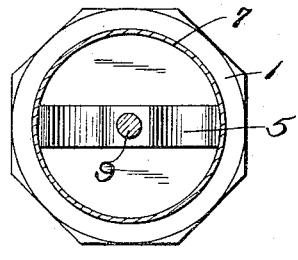
INVENTOR
George E. Johnson
WITNESSES
BY
ATTORNEY

UNITED STATES PATENT OFFICE.

GEORGE E. JOHNSON, OF WORCESTER, MASSACHUSETTS.

GREASE-CUP.

1,195,026. Specification of Letters Patent. Patented Aug. 15, 1916.

Application filed April 29, 1916. Serial No. 94,425.

*To all whom it may concern:*

Be it known that I, GEORGE E. JOHNSON, a citizen of the United States, residing at Worcester, in the county of Worcester and State of Massachusetts, have invented certain new and useful Improvements in Grease-Cups, of which the following is a specification.

This invention relates to grease cups such as are employed to be mounted upon various parts of moving machinery whereby lubrication of the moving parts may be accomplished; the primary object of the invention being to provide an adjusting cap which may be returned for ejecting a certain quantity of the lubricant within the cup.

As a further object of the invention the device contemplates the provision of interiorly arranged regulating means which acts as a gage for determining the amount of lubricant or grease that is ejected from the cup.

The invention also aims to provide a grease cup of this character, the casing of which will be screw threadedly engaged with the base of the cup and which will be provided with means for preventing the accidental loosening of the casing commonly caused by the vibration of the machinery to which the oil cups or grease cups of this character are attached.

A further object of this invention is the provision of a grease cup which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a side elevation. Fig. 2 is a vertical section. Fig. 3 is a horizontal section on the line 3—3 of Fig. 2. Fig. 4 is a horizontal section on the line 4—4 of Fig. 2.

The base 1 of the cup is provided with interior threads 2 and an enlarged annular recess 3. The annular recess 3 is of a diameter greater than the diameter of the interior threads 2 and receives the ends 4 of a flat spring 5. The outer periphery of the base 1 is provided with the flat sides for receiving the jaws of a wrench whereby it may be mounted upon the machine, the base being provided at its bottom with a depending extension 6 having screw threads on the outside for attaching it to the machine. The interior of the extension 6 is hollow and communicates with the interior recess of the base 1.

Screw threadedly mounted within the base 1 is a casing 7 having screw threads at its lower end for engagement of the screw threads 2 of the base 1 and the upper end of the casing is closed by the end wall 8. The end wall 8 has formed therein a central aperture which receives one end of the adjusting screw 9 which is provided with screw threads for the greater portion of its length, the screw threads terminating at the flange 10, the flange being integrally formed with the adjusting screw 9 and engaging the inner face of the end wall 8. The free end of the adjusting screw 9 engages the center of the flange spring 5 and will, when the parts are assembled, force the ends of the flat spring into the recess 3 of the base 1. The upper end of the adjusting screw 9 has mounted thereon the dome shaped cap 11, the depending flanges of which engage the outer side of the casing 7 and the cap is fastened to the adjusting screw so that the adjusting screw will be turned when the cap is rotated.

Interposed between the top of the cap and the shoulder 12 formed on the adjusting screw 9, is a central portion of a flat spring 13 which has its ends extending outwardly at and near to the center line of the adjusting screw and the free ends of the spring are bent to extend laterally with respect to the end wall 8 of the casing. Each of the free ends of the flat spring 13 have formed on their lower faces the lugs 14 which are adapted to register with the circular recesses 15 formed in the end wall 8 of the casing. These recesses 15 are four in number and extend equidistantly around the end wall 8.

Arranged within the casing is a piston 16 having the central bushing 17 which is provided with screw threads for engaging the screw threads of the adjusting screw 9 and, when the adjusting screw 9 is rotated, the piston 16 will move outwardly and thereby force the lubricant or grease, within the casing 7, outwardly through the lower part of the base 1 where it will be dispensed upon the moving parts of the machine.

It is necessary, in certain kinds of machinery, that a predetermined quantity of lubricant be applied to the moving parts of the machinery at regular intervals and, from the construction of this device it will be noted, that when the cap 11 is rotated the flat spring 13 will also be rotated and, when the cap has moved around for a quarter turn, the lugs 14 will register with the adjacent recesses 15, thereby predetermining and limiting the rotary movement of the cap and also ejecting a certain quantity of lubricant from the casing.

In reduction to practice I have found that the form of my invention illustrated in the drawings and referred to in the above description, as the preferred embodiment, is the most efficient and practicable; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

I claim:

1. A grease cup including a casing, grease ejecting means mounted within the casing, a cap rotatably mounted upon the casing and carried at one end thereof, and means carried within the cap and contacting with the casing for predetermining the rotary movement of the cap.

2. A grease cup including a casing, grease ejecting means mounted within the casing, the end of said casing being provided with a plurality of recesses, a cap mounted upon one end of the casing, and means carried by the cap and adapted to integrally engage the recesses in said casing for limiting the rotary movement of said cap.

3. A grease cup including a casing, an adjusting screw mounted within said casing, means operated by said adjusting screw and arranged within the casing for ejecting the contents of the casing, a cap screwed to one end of said adjusting screw and provided with depending flanges for engaging said casing, and means mounted within the cap and engaging the end of the casing for regulating the rotary movement of the cap.

4. A grease cup including a casing, a base provided with interior screw threads adapted to receive the end of said casing, an adjusting screw mounted within the casing, resilient means engaging the end of said adjusting screw and disposed within a recess provided in said base, a flat spring carried by the opposite end of said adjusting screw, the ends of said spring being provided with lugs and engaging means for rotating said screw.

5. A grease cup including a casing, cylindrical casing having one of its ends closed, the closed end of said cylinder being provided with a plurality of radially disposed recesses, an adjusting screw mounted within the casing, a piston slidably arranged within the casing and threadedly engaged with said adjusting screw, a flange integrally formed with said adjusting screw and contacting with the closed end of said casing, a cap rotatably mounted on one end of said casing and screwed to said adjusting screw and a flat spring connected with said adjusting screw and arranged within said cap, the ends of said flat spring adapted to intermediately engage the said recesses.

6. A grease cup including a casing, means mounted within the casing for ejecting the contents of the casing, a cap provided with a depending annular flange for engaging the exterior of the casing, said cap coöperating with said means for rotating on said casing when the ejecting means is operated, and means mounted within the cap and engaging the end of the casing for regulating the rotary movement of the cap.

7. A grease cup including a casing, ejecting means mounted within the casing, the said casing being provided with a closed end in which a plurality of depressions are formed, a cap rotatably mounted upon the closed end of the casing, and means carried by the cap and contacting with the casing and adapted to coöperate with the said depression for determining the rotary movement of the cap.

In testimony whereof I affix my signature in presence of two witnesses.

GEORGE E. JOHNSON.

Witnesses:
CHARLES HUMPHREY JOHNSON,
GUSTAF S. JOHNSON.

Copies of this patent may be obtained for five cents each, by addressing the "Commissioner of Patents, Washington, D. C."